United States Patent Office 3,756,892
Patented Sept. 4, 1973

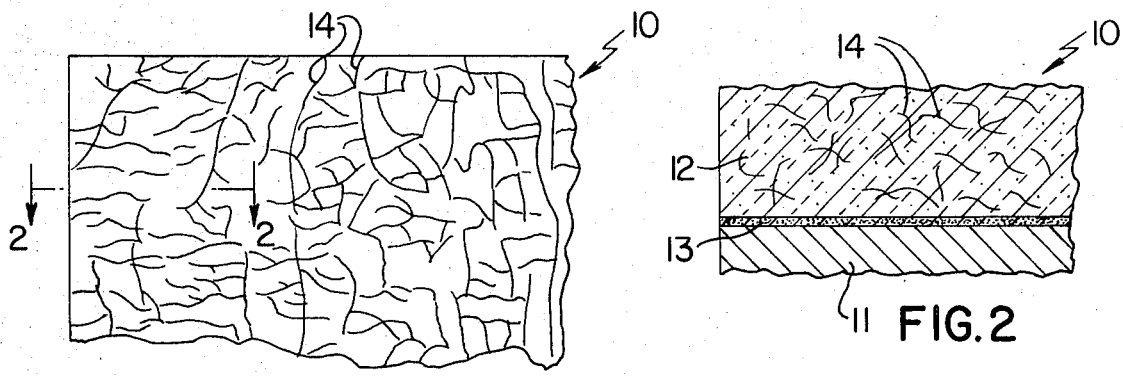
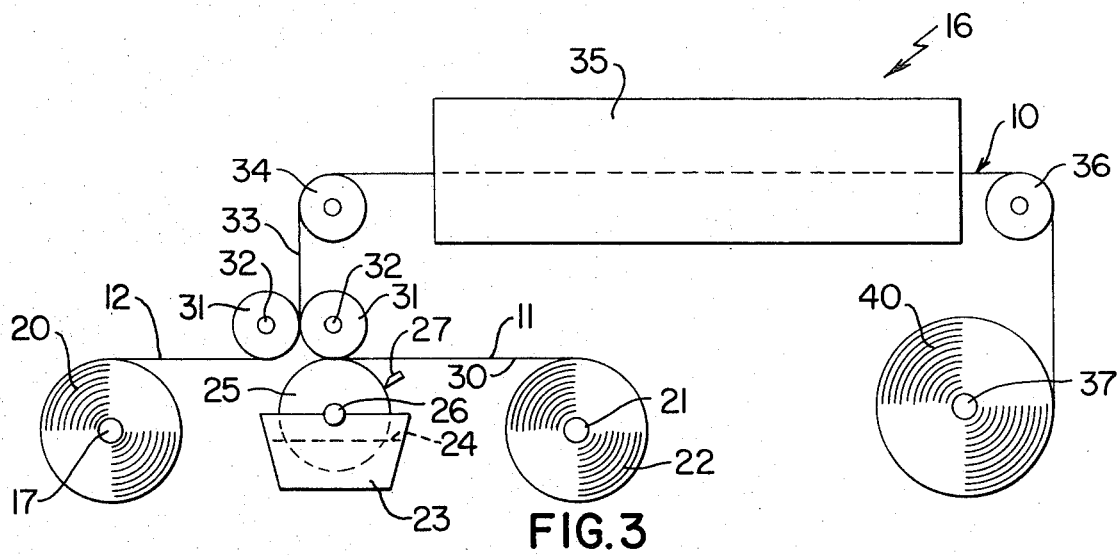
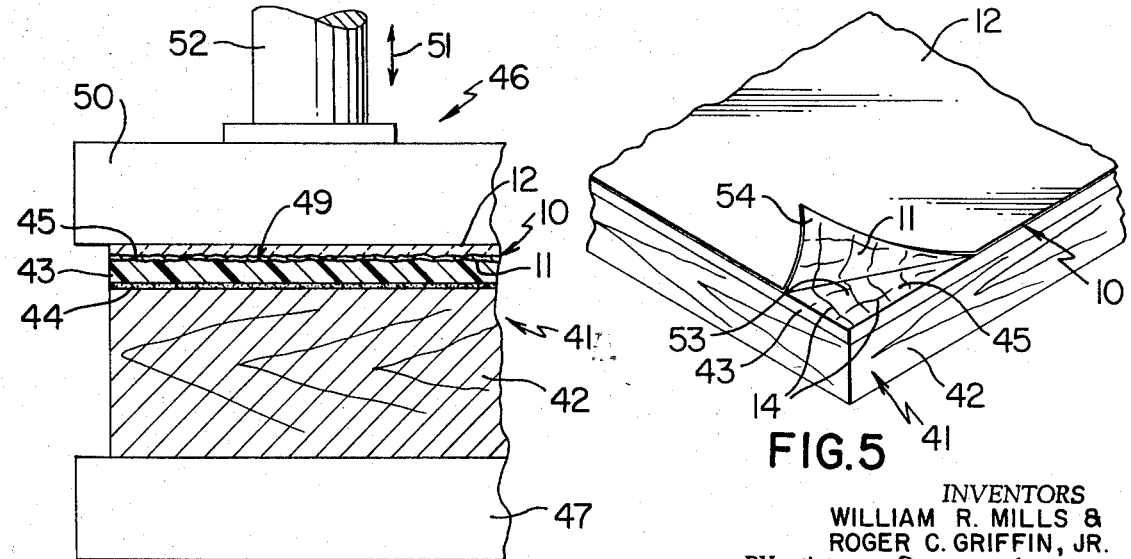

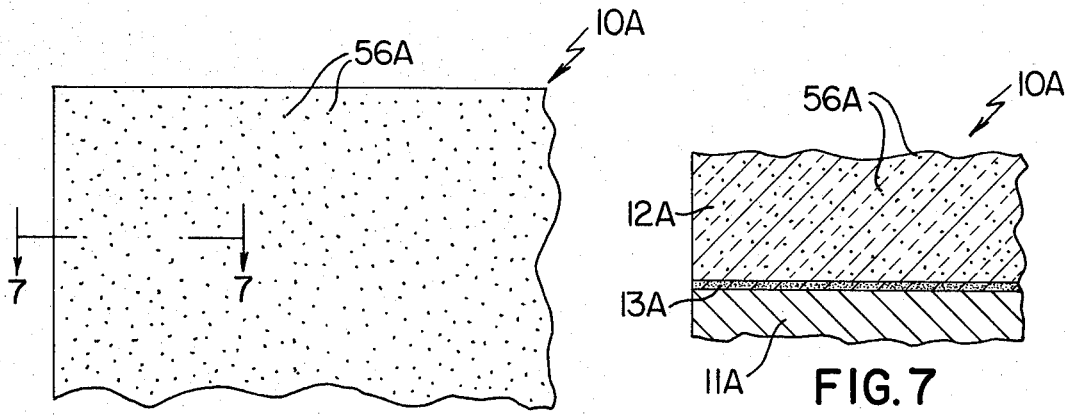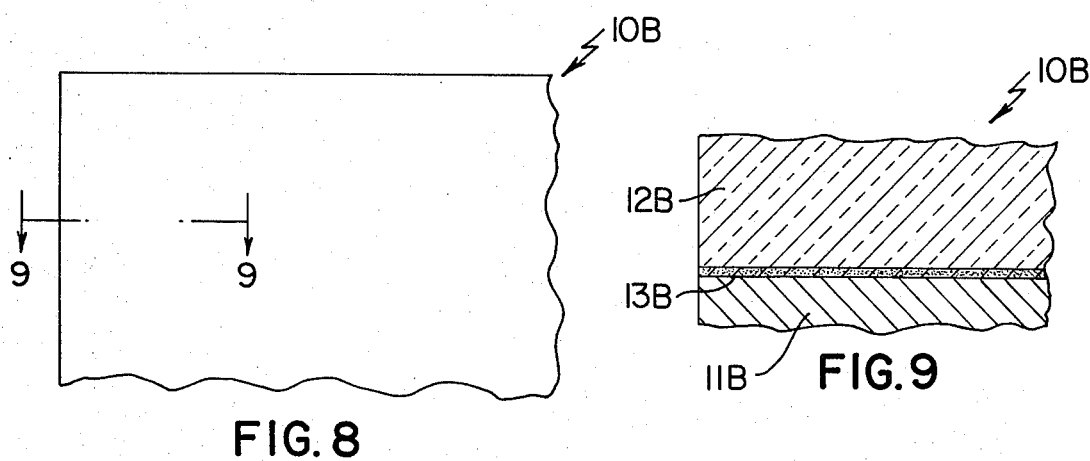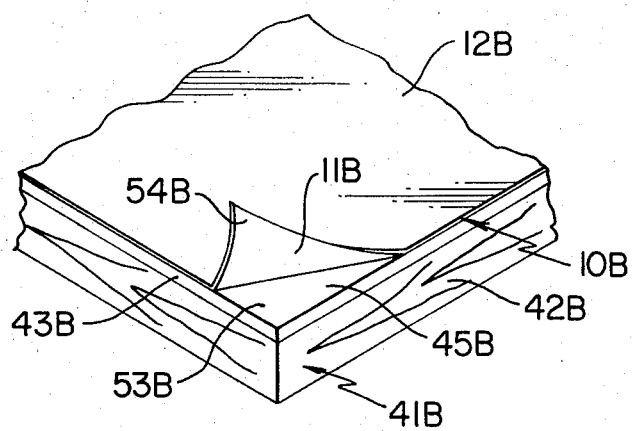

3,756,892
LAMINATE AND METHOD OF MAKING SAME
William R. Mills and Roger C. Griffin, Jr., Richmond, Va., assignors to Reynolds Metals Company, Richmond, Va.
Filed June 10, 1971, Ser. No. 151,774
Int. Cl. B32b 31/20; C09j 7/00
U.S. Cl. 156—323                    10 Claims

ABSTRACT OF THE DISCLOSURE

A laminate and method of making same is provided wherein the laminate is comprised of a layer of metallic foil and a layer of cellophane bonded together by a casein-latex adhesive with the adhesive enabling the provision of the laminate at comparatively low cost while providing a high strength bond between the layers.

BACKGROUND OF THE INVENTION

Laminates commonly referred to as caul stocks or release sheets are used in the manufacture of high pressure laminated constructions used to make wall panels, counter tops, and furniture, for example. Usually, these laminated constructions are made in two basic types, those having exposed surfaces which are smooth and those having exposed surfaces provided with a roughened or matte finish. So-called smooth caul stock has been made by aqueously laminating metallic foil to high quality paper under controlled conditions while caul stock with a matte finish has been made by aqueously laminating metal foil to paper ranging in quality from parchment sheets to kraft sheets, for example, relying on the fiber patterns or wire marks in the paper to produce a rough pattern on the exposed surface of the laminated construction by telegraphing their outlines or configurations through the metallic foil.

Currently used smooth caul stock even though made using top quality paper is deficient because defects such as dirt, slime spots, etc. are still present in the paper and produce corresponding defects and discolorations in the final laminated construction. Also, currently available caul stock used to impart a matte finish is deficient because of the nonregularity and poor character of the fibers in low grade papers used to make this type of caul stock whereby blotchy surfaces are produced. These deficiencies require scrapping and refinishing of large quantities of laminated constructions and add unnecessary expense to laminating operations.

SUMMARY

This invention provides an improved laminate and method of making same wherein the laminate is particularly adapted for use as caul stock or a release sheet in the manufacture of high pressure laminated constructions of all types and for a wide variety of uses and which eliminates the deficiencies of present laminates. The laminate is comprised of a layer of metallic foil and a layer of cellophane which are bonded together by a casein-latex adhesive whereby the laminate is produced at a comparatively low cost yet the adhesive provides a high strength bond between the cellophane and the metallic foil.

The cellophane layer of the laminate may have particulate material embedded therein with the amount of such particulate material ranging from zero to large amounts controlled as to character and distribution. Thus, laminates having substantially no particulate material in the cellophane layer define release sheets having optimum smoothness while laminates having particulate material therein which is controlled make it possible to provide precisely controlled finishes in the manufacture of associated laminated constructions by telegraphing or transmitting the outline of the particulate material through the metallic foil without rupturing the foil.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which FIG. 1 is a plan view of a fragmentary portion of one exemplary embodiment of a laminate of this invention;

FIG. 2 is a greatly enlarged fragmentary cross-sectional view taken on the line 2—2 of FIG. 1;

FIG. 3 is a schematic presentation in side elevation and illustrates one exemplary embodiment of an apparatus and method which may be used to make the laminate of FIG. 1;

FIG. 4 is a fragmentary view with parts in cross-section and parts broken away illustrating cooperating components of a press and the manner of forming a laminated construction under pressure using the laminate of FIG. 1 to impart a desired appearance or surface finish;

FIG. 5 is a fragmentary perspective view illustrating the release sheet of the laminated construction of FIG. 4 partly peeled away to show the manner in which particles embedded in the cellophane layer are telegraphed through the layer of metallic foil to define a matte or roughened surface finish or texture on an exposed surface of the laminated construction;

FIG. 6 is a view similar to FIG. 1 illustrating another exemplary embodiment of the laminate of this invention;

FIG. 7 is a view similar to FIG. 2 taken on the line 7—7 of FIG. 6;

FIG. 8 is a view similar to FIG. 1 illustrating still another exemplary embodiment of the laminate of this invention;

FIG. 9 is a view similar to FIG. 2 taken on the line 9—9 of FIG. 8; and

FIG. 9A is a view similar to FIG. 5 illustrating a laminated construction made using the laminate of FIG. 8 to define a smooth surface finish on an exposed surface of such construction.

DESCRIPTION OF ILLUSTRATED EMBODIMENTS

Reference is now made to FIGS. 1 and 2 of the drawings which illustrate one exemplary embodiment of an improved laminate made in accordance with this invention and such laminate is designated generally by the reference numeral 10 and is particularly adapted to be used as caul stock or a release sheet in the manufacture of high pressure laminated constructions such as wall panels, counter tops, furniture, and the like. The laminate 10 is comprised of a layer of metallic foil, such as aluminum foil, for example, and a layer of cellophane 12, with the layers being bonded together by a casein-latex adhesive 13 whereby the laminate is comparatively low in cost yet the adhesive 13 provides a comparatively inexpensive high strength bond between the layers or webs of metallic foil 11 and cellophane 12.

The cellophane layer or web 12 is basically fluid permeable and has a particulate material shown in this example in the form of elongated string-like or thread-like particles of different lengths embedded in a random manner therein whereby the basic thickness of the layer or sheet 12 serves as a matrix for the randomly distributed particles 14.

The laminate 10 may be made in any suitable manner; however, such laminate is preferably made utilizing the apparatus and method illustrated in FIG. 3 of the drawings and designated generally by the reference numeral 16. The apparatus 16 comprises a rotatable shaft 17 which has a web of clear cellophane 12 wound thereon to define a roll 20. The apparatus 16 also comprises a rotatable shaft 21 which has a web of metal foil 11 would thereon to define a roll 22. The shafts 17 and 21 are suitably supported for unwinding rotation and suitable means may be provided and operatively associated with each of shafts 17 and 21 and their respective rolls to provide controlled unwinding of the aluminum foil and cellophane webs or layers 11 and 12 respectively under the desired tension.

The apparatus 16 also has a reservoir 23 containing an aqueous emulsion of a casein-latex adhesive 24 and an applicator roll 25, such as a squeegee type roll, for example, is rotatably supported on a shaft 26 so that its outer surface is coated with adhesive. The coated roll 25 is rotated past a doctor blade 27 of conventional construction which assures that the desired amount of adhesive is retained on the surface of the roll and the roll is then moved into contact with the bottom or lower surface 30 of the web of metal foil 11.

The web 11 with adhesive applied on its surface 30 is then moved between a pair of cooperating nip rolls 31 each rotatably supported on an associated shaft 32 and urged toward the web of cellophane 12 also moving between the nip rolls 31 to thereby define a sandwich-like assembly 33. The assembly 33 is moved around a turn roll 34 and through a heated environment, shown in this example as an oven 35, wherein moisture or water in the adhesive 24 is driven out through the permeable cellophane layer 12 to thereby provide the desired level of adhesion. The completed laminate 10 exiting the oven 35 is then moved around another turn roll 36 and suitably wound in coil form about a rotatable shaft 37 to define a supply roll 40 of laminate 10.

The oven 35 is maintained at a controlled temperature above ambient and in one application the oven was maintained at a temperature of roughly 250° F. and provided satisfactory drying of the laminate 10 for a continuous production operation.

As previously indicated, the laminate 10 is particularly adapted to be used as a release sheet in making a laminated construction under controlled pressure and temperature conditions. In this disclosure, the laminate 10 is employed, as shown in FIG. 4, to define a matte finish in the manufacture of a laminated construction 41 comprised of a plurality of members 42 and 43 used to make high grade furniture. The member 42 of this example is in the form of a comparatively thick base layer of wood 42 and the member 43 comprises an outer layer of hard plastic-like material 43 which are to be bonded together using a suitable adhesive 44 therebetween. However, it is to be understood that any number of members may be suitably laminated together to define a construction with these members being made of any suitable material known in the art; and, the method of this invention is applicable to providing a controlled finish on an exposed surface of such construction.

As seen in FIG. 4, the laminate or release sheet 10 has a release agent or coating 49 applied against its metallic foil layer 11 and the sheet 10 is placed on the top surface 45 of the hard plastic layer 43 with its coating 49 against surface 45. The character of the release coating 49 will be discussed subsequently; however, such coating cooperates with the layer of metallic foil 11 to assure quick release of the release sheet from the top surface 45.

The entire assembly is then place in a standard press, designated generally by the reference numeral 46, and such press comprises a fixed lower platen 47 and a movable upper platen 50 which may be suitably moved up and down as indicated by the double arrow at 51 by a vertically movable shaft 52 fixed to the platen 50.

With the construction 41 and the release sheet 10 in position the platen 50 is urged under high pressure toward the fixed platen 47 applying substantial pressure as well known in the art whereby the outlines of the particles 14 are transmitted or telegraphed through the aluminum foil layer 11 to provide a high quality roughened or matte finish which is free of defects on the now completed top surface 45 of the hard plastic material 43 and as shown at 53 in FIG. 5. The matte finish shown at 53 has indentations therein corresponding to the size, arrangement, and random embedment of the various particles 14 in the cellophane layer 12. Also, it will be appreciated that the cellophane serves to cushion each particle 14 so it will not tear the foil layer 11.

Because the aluminum foil layer 11 aided by the release coating 49 is positioned on the top surface of the plastic layer or sheet 43, the laminate 10 may be readily removed from the construction 41 by grasping and pulling a corner 54 thereof. This easy removal is made possible because the aluminum foil 11, in itself, has very little tendency to cling to the plastic material 43 even after being subjected to high pressures; and, with the aid of the release coating 49 there is vitrually no tendency for the foil to cling. Further, in those applications wherein one or both platens 47 or 50 are heated, by suitable internal heating means, for example, the laminate 10 is still easily removed from the laminated construction 41.

Two other exemplary embodiments of laminates of this invention are illustrated in FIGS. 6–7 and 8–9. The laminates illustrated in FIGS. 6–7 and 8–9 are similar to the laminate 10; therefore, such laminates will be designated generally by the reference numerals 10A and 10B for the laminates of FIGS. 6–7 and 8–9 respectively and representative parts or layers of each laminate which are similar to corresponding parts of the laminate 10 will be designated by the same reference numeral as in the laminate 10 also followed by an associated letter designation either A or B and not described again. Only those component parts of each laminate which are different from corresponding parts of the laminate 10 will be designated by a new reference numeral also followed by an associated letter designation and described in detail.

The particle embedded in the cellophane sheet 12 of the exemplary laminate are in the form of comparatively compressible particulate cellulosic particles 14. Thus, the particles are capable of being partially compressed and their outlines transmitted or telegraphed through the aluminum foil whereby they impart an improved matte finish to the top surface 45 of the plastic layer 43 yet do not tear through the aluminum foil.

The laminate 10A instead of having partially compressible particulate cellulosic material embedded in its cellophane layer has comparatively incompressible particulate material, such as particles 56A, suitably embedded in the cellophane layer 12A with the main portion of layer 12A serving as a matrix therefor. In addition, the layers 11A and 12A of laminate 10A are bonded together by a casein-latex adhesive in a similar manner as the layers 11 and 12 of the laminate 10.

The particles 56A may be in the form of finely divided grain-like particles of clay or particles of powdered silica. Upon using the laminate 10A as a release sheet in a similar manner as described in connection with the laminate 10 shown in FIG. 4, the outlines of such particles are transmitted through the metallic foil layer 11A and define a corresponding grain-like matte finish in the top surface of a hard plastic material such as plastic layer 43, for example.

The laminate 10B is substantially free of particulate material in its cellophane layer 12B and as will be readily apparent from a viewing of FIG. 9 of the drawing. However, as in the case of the laminate 10, the metallic foil layer 11B is bonded in a high strength manner to the cellophane layer 12B using an aqueous solution of a casein-latex adhesive 13B.

Upon forming a high pressure laminated construction utilizing the laminate 10B, and in a similar manner as shown in FIG. 4 using the laminate 10, the top surface 45B of a hard plastic sheet 43B is smooth and thus free of a roughened appearance, indentations, or the like, as will be apparent at 53B in FIG. 9A which shows a corner 54B of the laminate 10B peeled away from construction 41B. Thus, the laminate 10B enables the provision of the laminated construction 41B having an exposed top surface 45B having optimum smoothness and which is free of defects.

The laminates 10A–10B may be made using any suitable apparatus and method; however, such laminates are preferably made using the apparatus and method illustrated in FIG. 3 of the drawings.

The metallic foil layers 11, 11A, and 11B comprising the laminates 10, 10A, and 10B respectively are preferably layers of metallic foil containing aluminum which may be referred to simply as layers of aluminum foil and each layer may range in thickness between .00035 and .0007 inch. It has been found that aluminum foil within this thickness range is not ruptured by particles embedded in the associated cellophane layer. Further, the aluminum foil enables quick release of the associated laminate from a laminated construction formed using such laminate.

The cellophane layers 12, 12A and 12B comprising the laminates 10, 10B, respectively, are each preferably between .0005 and .001 inch thick. It has been found that within this thickness range it is possible to embed cellulosic particles as well as comparatively incompressible particles with the basic thickness of the surface serving as a matrix whereby substantially all surfaces of each particle are in intimate contact with the cellophane.

As previously indicated, the adhesives 13, 13A, and 13B comprising the laminates 10, 10A, and 10B respectively are each preferably in the form of an aqueous emulsion of a casein-latex adhesive. One example of such an adhesive is sold under the trade designation NT–565 by Borden Chemical Company, Division of the Borden Co., 350 Madison Ave., New York, N.Y. Another example of such an adhesive is sold under the trade designation of PF–99, by Polymer Industries, Inc., Viaduct Road, Springdale, Conn. 06907.

In normal manufacture of casein-latex adhesive, casein is solubilized in water by pH adjustment to the alkaline side of neutrality. A suitable latex such as synthetic styrene-butadiene copolymer is then added with rapid stirring to form an aqueous emulsion of the latex. The pH of the batch is then normally adjusted to the acid side of pH to stabilize the preparation. The adhesive may contain ingredients such as surface active agents, defoamers, buffering agents, and the like. Further, the alkali and acid materials used in pH adjustment may vary over a wide range. For example, sodium hydroxide or ammonium hydroxide may be used to obtain alkaline conditions, whereas, hydrochloric acid, sulfuric acid, hydrofluoric acid and the like, may be used to obtain acid conditions.

This adhesive may also be manufactured using other latices, such as butadiene-acrylonitrile copolymer, butadieneacrylonitrile-styrene copolymer, neoprene(2 - chloro-1,3-butadiene), and natural latex, for example.

The amount of casein-latex adhesive which is employed in making the laminates 10, 10A, and 10B may vary from 2 to 4 pounds of wet adhesive per 3,000 square feet of laminate. In the dried condition the amount of adhesive between the layers comprising each laminate 10, 10A, or 10B is generally of the order of 1 pound for each 3,000 square feet of laminate.

As indicated earlier, the thicknesses of aluminum foil and cellophane are preferably within certain thickness ranges for maximum economy; however, it will be appreciated that the aluminum foil and/or cellophane may be substantially thicker in certain applications.

One example of a laminate or release sheet of this invention which has been used successfully utilized aluminum foil having a thickness of .00035 inch, cellophane having a thickness of .0015 inch and having particulate cellulosic particles embedded therein, and a casein-latex adhesive bonding these layers together which weighed roughly 1 pound per 3,000 square feet of dried or completed laminate.

The release agent or coating 49 may be of any suitable type and may comprise fatty acids, oils, silicones, light greases and the like. Typical fatty acids include stearic, palmitic, myristic and oleic acids or mixtures of these in varied proportions. Typical oils include white mineral oil, light petroleum distillates, and the like. Typical silicones include fluids having a viscosity of more than 300 centistokes; and, one exemplary silicone fluid which may be used is manufactured by the Dow Corning Corporation, Chemical Products Division, Midland, Mich., and is sold under the trade name of Dow Corning 200.

The amount of release agent used will vary depending upon the conditions under which it is used. It has been found that stearic acid, for example, when applied at a level of from about .05 to 0.2 pound per 3000 square feet of surface provides optimum release. This amount may be applied by spraying, dip coating, gravure application from a solvent solution, etc. In applying stearic acid by gravure means, the stearic acid is first dissolved in a suitable solvent such as toluene, and may then be applied onto the exposed surface of the foil 11 comprising laminate 10 using a gravure cylinder which operates in a similar manner as the applicator roll 25 of FIG. 3.

While present embodiments of this invention, and methods of practicing the same, have been illustrated and described, it will be recognized that this invention may be otherwise variously embodied and practiced within the scope of the following claims.

What is claimed is:

1. A method of making a laminated construction having a surface which is free of defects comprising the steps of, arranging a plurality of members comprising said construction between relatively movable platens of a press with an adhesive interposed between adjoining members and with an outer one of said members having an exposed surface, placing a laminate made of a layer of metallic foil and a layer of cellophane bonded together with a casein-latex adhesive so that the metallic foil layer is arranged adjacent said surface, moving said platens together to compress and laminate said members together while simultaneously urging said laminate against said exposed surface to define said laminated construction, separating said platens to release said laminated construction, and peeling said laminate away from said construction due to the poor adhesion of said metallic foil against said surface, said laminate being free of defects in its layers to thereby define said surface which is also free of defects.

2. A method as set forth in claim 1 in which said placing step comprises placing a laminate having a partially compressible particulate cellulosic material embedded in said cellophane layer with said cellophane layer serving as a matrix for said compressible particulate material, said compressible cellulosic material being partially compressed and having its outline transmitted through said metallic foil layer during said moving step to provide an improved matte finish with minimum indentation of said surface, and comprising the further step of interposing a release agent between said exposed surface and said layer of metallic foil, said release agent further assuring easy peeling of said laminate during said peeling step.

3. A method as set forth in claim 1 in which said placing step comprises placing a laminate having particulate material embedded in said cellophane layer with said cellophane layer serving as a matrix for said particulate material, said particulate material having its outline transmitted through said metallic foil layer without rupturing said metallic foil layer during said moving step to impart a controlled matte finish on said surface which is free of said defects, and comprising the further step of interposing a release agent between said exposed surface and said layer of metallic foil, said release agent further assuring easy peeling of said laminate during said peeling step.

4. A method as set forth in claim 3 in which said placing step comprises placing a laminate having said metallic foil layer in the form of an aluminum foil layer.

5. A method as set forth in claim 3 in which said interposing step comprises applying a coating of said release agent against said layer of metallic foil.

6. A method as set forth in claim 3 in which said placing step comprises placing a laminate having said metallic foil layer in the form of an aluminum foil layer and said interposing step comprises applying a coating of stearic acid in the amount of .05 to .2 pound per 3000 square feet against said layer of aluminum foil.

7. A method as set forth in claim 3 and comprising the further step of heating said platens to a controlled temperature prior to said relatively moving step.

8. A method as set forth in claim 3 in which said placing step comprises placing said laminate having said particulate material embedded therein which is comparatively incompressible compared to said cellophane.

9. A method as set forth in claim 8 in which said placing step comprises placing said laminate having said particulate material in the form of clay embedded therein.

10. A method as set forth in claim 8 in which said placing step comprises placing said laminate having said particulate material in the form of powdered silica embedded therein.

References Cited
UNITED STATES PATENTS

| | | | |
|---|---|---|---|
| 3,507,733 | 4/1970 | Davidson | 156—289 X |
| 2,431,720 | 12/1947 | Willey | 156—289 |
| 3,533,875 | 10/1970 | Carevic et al. | 156—289 |
| 2,680,700 | 6/1954 | Meyers | 156—289 |
| 3,475,268 | 10/1969 | Bilchses | 161—217 X |
| 3,445,327 | 5/1969 | Fuerst | 156—323 X |
| 3,380,876 | 4/1968 | Rusher | 161—161 X |
| 2,606,855 | 8/1952 | Jenkins | 156—323 |
| 3,373,068 | 3/1968 | Groshein et al. | 156—289 X |

ALFRED L. LEAVITT, Primary Examiner

C. WESTON, Assistant Examiner

U.S. Cl. X.R.

156—288, 289